United States Patent Office 3,142,574
Patented July 28, 1964

3,142,574
METHOD OF MAKING A CRANBERRY RELISH
Edward E. Anderson, Lexington, Mary P. Giggey, Woburn, William F. Hampton, South Duxbury, and Carol P. Shaw, Waltham, Mass., assignors, by direct and mesne assignments, to Ocean Spray Cranberries, Inc., Hanson, Mass., a corporation of Delaware
No Drawing. Filed Sept. 24, 1962, Ser. No. 225,840
4 Claims. (Cl. 99—102)

This invention relates to a new processed food product and to a method for making it, and more particularly to a process for making a relish containing cranberries as a major constituent.

The use of oranges in combination with cranberries to form a fresh relish has been known for some time. Typically, in the preparation of such a relish, the housewife grinds together fresh cranberries and whole oranges, normally in a ratio of about one orange to two cups of fresh cranberries. The resulting ground mixture is mixed with sugar and eaten without cooking or otherwise processing it, possibly with the addition of other ingredients such as apple, nuts, raisins, etc. Relishes of this type are now preserved by freezing and sold as a frozen relish product. If the housewife prepares her own cranberry-orange relish, it is necessary that it be consumed relatively shortly after the relish has been prepared since it is not processed, and therefore it will not keep for any extended period of time. If, on the other hand she buys it as a frozen product the relish must, of course, be kept frozen until use, and then once it is thawed it must be consumed relatively shortly thereafter as in the case of the freshly prepared relish.

These fresh relishes which are now known contain the whole orange including peel, pulp and all of its juice. Such a relish tends to be watery due to the grinding of the cranberries and whole oranges, a process which extracts most of the natural juices as a liquid. The process of freezing such relishes for marketing appears to further extract the juices from the cranberries and from the oranges. This in turn means that when the relish is thawed it has an adverse dry and stringy texture associated with it due to the fact that it is in reality a two-phase system, e.g., a liquid and mixture of whole and/or coarsely cut particulate solids.

Finally, in grinding the cranberries and the oranges together in preparing the normally used fresh relishes of this kind minimal textural contrasts are present in the relish. Such textural contrasts are considered highly desirable in a relish-type product.

We have found that it is possible to make a cranberry-orange relish which can be processed and canned, thereby eliminating the disadvantage for substantially immediate consumption present in homemade or frozen relish after thawing. By using a small amount of only the peel, and by proper control of its particle size, we have found that it is possible to make a true relish-type product with cranberries which has a highly acceptable flavor and good textural qualities.

While we have found it possible to prepare such a relish using comminuted whole oranges, frozen or canned orange peel bits, or orange juice as the source of orange flavor, the most and hence preferable relish from a flavor, texture, and economical standpoint is made using only the orange peel (either fresh or frozen) comminuted just prior to use. In addition to cranberries, orange peel, sugar and water, other ingredients can be added to give further flavor and texture enhancements. These other additives include raisins, nuts, apples, and minor quantities of other citrus fruits such as lemon, lime, or grapefruit.

It is therefore a primary object of this invention to provide a novel method for processing cranberries with oranges. It is another object of this invention to form a relish-type product of cranberries and oranges which exhibits good flavor and texture. Other objects of the invention will in part be obvious and will in part be apparent hereinafter.

The invention accordingly comprises the several steps and the relation of one or more of such steps with respect to each of the others, and the articles possessing the features, properties and the relation of elements, which are exemplified in the following detailed disclosure, and the scope of the invention will be indicated in the claims.

The method of this invention comprises the steps of comminuting whole cranberries, reducing orange peels by cutting to form particles ranging in maximum size from about one-eighth to one-half inch, combining the comminuted cranberries and orange particles with sugar and water and subsequently rapidly heating the mixture to between about 200 and 215° F., thereby to form a semi-jelled cranberry product having the orange peel uniformly distributed throughout and having a soluble solids content of from about 38% to 54% by weight. The soluble solids content is a measure of the sugar content in the resulting product.

The cranberries are used in the form of whole cranberries which may be fresh or frozen ones or frozen ones which have been thawed or partially thawed. In preparing the cranberries, the degree of comminution is important, for it is necessary to cut the cranberries so as to reduce the toughness of the skins without destroying the variation in texture resulting from discrete pieces of cranberries. Good results have been obtained by passing whole cranberries through a Fitzpatrick Comminutor Screen No. 5 having perforations of 0.5 inch in diameter. The use of the cut cranberries contributes materially to the flavor of the relish thus formed, and it also prevents the formation of skin rollers in the processed product.

Where any appreciable quantity of the cranberries are not cut or when they are cut excessively finely, the resulting semi-jelled relish does not possess the desirable textural contrast between the pieces of cranberries, the orange particles, and the semi-jelled matrix. For practical purposes, it is preferable to maintain substantially all of the cranberry particles less than about 0.5 inch in maximum dimension. It will be appreciated that in the process of comminution a range of particle sizes will be obtained. In this size range specified, the relish has a consistently smooth, jellied matrix with discrete cranberry and orange particles being present and without any tough skins being present.

Comminution may be accomplished by any known grinding apparatus which will reduce the whole berries to the size specified, and which in particular reduces the skins without forming tightly rolled skin pieces. Thus the apparatus must be capable of macerating the skins rather than just removing them and rolling them up. We have found a so-called Fitzpatrick Comminutor and their accessories particularly well suited to attaining the desired degree of comminution of the whole cranberry. Equally applicable is the use of an Urschel-type dicer, or of a cutting mill which literally cuts, rather than grinds, the cranberries into the required particle size.

Although whole fresh oranges, frozen or canned orange peel, or fresh, frozen or canned orange juice can be used, we have found the preferable source of orange to be from freshly comminuted orange peel. This peel may be fresh or frozen, and is conveniently the by-product peel remaining after the remaining portion of the orange has been used in preparing frozen or canned products, e.g., frozen orange juice or canned orange sections.

In order to give the resulting relish a texture which exhibits a contrast between the size of the cranberry particles and the size of the orange particles and to give desirable flavor, it is necessary to cut the orange peel to cube-like particles varying in size from about one-eighth to one-half inch in maximum dimension. After processing, it is found that there is a real contrast between the size of the cranberry and orange particles present. This is a textural contrast that is desirable and which is typically associated with a relish or pickle-like products. The cutting of the orange peel may be accomplished in any suitable fashion such as by use of an Urschel dicer or an Urschel cutting mill, the latter being a device which in effect drives the orange material by centrifugal force through blade openings set at a desired distance.

The use of the orange peel alone as the source of orange flavor contributes a characteristic flavor to the finished relish, a flavor which is dependent upon the essential oils present in the orange peel. There appears in the final relish product an especially good blending of the cranberry flavor with the orange peel flavor. Moreover, since the orange peel does not contribute additional liquid the final processed relish made by our method possesses a certain homogeneity in the matrix surrounding the discrete pieces (i.e., lack of two distinct phases) not exhibited by the fresh or frozen relishes.

Sugar is added to the cranberries and orange mixture to sweeten and partially extract the liquids naturally present in the berries. Water is also added either as water or in the form of liquid sugar syrup. The amount of water and sugar added is that which will give a final relish product having a soluble solids (sugar) content ranging from about 38% to 54% by total weight.

A typical ratio of cranberries to sugar to water is about 1:1:0.8. Variations in berry maturity, pectin content and desired sugar-acid ratio will determine the precise ratio used. The amount of orange peel added should range from about 1.0 to 2.0, with about 1.3% by weight of the total relish weight being preferred.

In preparing the relish of this invention, the cranberries and oranges are reduced to the desired particle sizes in separate operations and the cranberries added to an appropriate amount of sugar and water. The mixture is then brought to a temperature of between about 180 and 200° F. as rapidly as possible at which time the orange peel is added. The mixture is then rapidly brought to a temperature of 200 to 215° F. Once the mixture has reached this temperature, it is filled into suitable containers and canned by any well known and suitable technique, such as packing the jars under inert gases, steam-flow closing, or vacuum closing. After canning, the product is cooled as fast as practicable to a temperature of about 120° F., or below, to protect color and flavor of product. It is then permitted to come to room temperature under the handling and storage conditions used.

The process and product of this invention may be further described in the following example which is meant to be illustrative and not limiting.

*Example 1*

Thirty pounds of raw, Early Black cranberries was put through an Urschel cutting mill and reduced to a product in which the cranberry particles varied in size from about 0.001 to 0.5 inch. In a separate operation, 1.13 pounds of fresh orange peel was comminuted to form ⅛ to ¼ inch cubes. Comminution was carried out by an Urschel dicer. The 30 pounds of comminuted cranberries was then added to 30 pounds of sugar dissolved in 22.5 pounds of water. The entire mixture was then rapidly heated to 200° F. at which time the 1.13 pounds of orange peel was added. When the temperature reached 212° F. the mixture was filled into half-pint jars and the jars were sealed and inverted for 1 minute to sterilize the covers. The jars and the contents were then water cooled to about 110° F.

The resulting cranberry-orange relish was a stable product with a well balanced flavor and texture. The larger orange peel particles were evenly distributed throughout a semi-jelled cranberry matrix, thus giving a final product of unique flavor and one which had a texture associated with true relishes.

It will thus be seen that the object set forth above, among those made apparent from the preceding description, are efficiently attained and, since certain changes may be made in carrying out the above method and in the article set forth without departing from the scope of the invention, it is intended that all matter contained in the above description shall be interpreted as illustrative and not in a limiting sense.

We claim:
1. Method for forming a cranberry relish comprising the steps of
   (a) comminuting whole cranberries to form particles substantially all of which are less than one-half inch in maximum dimension but greater than 0.001 inch whereby there are present in said relish discrete identifiable cranberry particles;
   (b) cutting orange peel to form cube-like particles ranging in size from about one-eighth to one-half inch;
   (c) adding the comminuted cranberries to a water solution of sugar and rapidly heating the resulting mixture to a temperature between about 180 and 200° F.;
   (d) adding the orange peel particles to the heated mixture and rapidly further heating to a temperature between about 200 and 215° F. thereby to form a relish product; and
   (e) cooling the relish product as rapidly as possible to at least 120° F. to protect color and flavor.

2. Method in accordance with claim 1 wherein said orange peel is added in an amount equivalent to between about 1 and 2% by weight of the total relish weight.

3. Method in accordance with claim 1 wherein the ratio of cranberries to sugar to water is about 1:1:0.8.

4. Method in accordance with claim 1 including the step of canning the relish as soon as it is brought to temperature in step (d).

References Cited in the file of this patent

UNITED STATES PATENTS

| | | |
|---|---|---|
| 1,634,295 | McLaughlin | July 5, 1927 |
| 2,700,614 | Critzman et al. | Jan. 25, 1955 |
| 3,019,111 | Spross | Jan. 30, 1962 |
| 3,023,108 | Anderson et al. | Feb. 27, 1962 |